United States Patent [19]

Ohmi et al.

[11] Patent Number: 5,822,497
[45] Date of Patent: Oct. 13, 1998

[54] DATA SORTING CIRCUIT

[75] Inventors: Tadahiro Ohmi; Tadashi Shibata; Takeo Yamashita, all of Miyagi, Japan

[73] Assignee: Tadashi Shibata and Tadahiro Ohmi, Sendai, Japan

[21] Appl. No.: 507,467

[22] PCT Filed: Feb. 22, 1994

[86] PCT No.: PCT/JP94/00262

§ 371 Date: Sep. 29, 1995

§ 102(e) Date: Sep. 29, 1995

[87] PCT Pub. No.: WO94/19760

PCT Pub. Date: Sep. 1, 1994

[30] Foreign Application Priority Data

Feb. 22, 1993 [JP] Japan .................................. 5-031020

[51] Int. Cl.⁶ .................................................. G06E 15/18
[52] U.S. Cl. ........................................................ 395/24
[58] Field of Search ................................ 395/24, 23, 27; 365/230.01, 218, 185.22, 49, 154; 326/35, 88, 109, 121, 36, 39; 321/516; 607/9

[56] References Cited

U.S. PATENT DOCUMENTS

| | | | |
|---|---|---|---|
| 4,622,735 | 11/1986 | Shibata | 438/143 |
| 4,631,686 | 12/1986 | Ikawa et al. | 364/490 |
| 5,214,609 | 5/1993 | Kato et al. | 365/230.01 |
| 5,258,657 | 11/1993 | Shibata et al. | 326/35 |
| 5,331,215 | 7/1994 | Allen et al. | 395/24 |
| 5,349,247 | 9/1994 | Hush et al. | 326/88 |
| 5,361,227 | 11/1994 | Tanaka et al. | 365/185.22 |
| 5,362,672 | 11/1994 | Ohmi et al. | 117/108 |
| 5,365,123 | 11/1994 | Nakase et al. | 326/109 |
| 5,377,138 | 12/1994 | Hiroshi et al. | 365/154 |
| 5,391,188 | 2/1995 | Nelson et al. | 607/9 |
| 5,461,584 | 10/1995 | Ikuta et al. | 327/516 |
| 5,469,085 | 11/1995 | Shibata et al. | 326/121 |
| 5,483,479 | 1/1996 | Osawa et al. | 365/49 |
| 5,521,858 | 5/1996 | Shibata et al. | 365/185.03 |
| 5,535,167 | 7/1996 | Hazani | 365/218 |
| 5,539,329 | 7/1996 | Shibata et al. | 326/39 |
| 5,587,668 | 12/1996 | Shibata et al. | 326/36 |
| 5,594,372 | 1/1997 | Shibata et al. | 326/121 |

FOREIGN PATENT DOCUMENTS

4-271486  9/1992  Japan .

Primary Examiner—Robert W. Downs
Assistant Examiner—Sanjiv Shah
Attorney, Agent, or Firm—Baker & Daniels

[57] ABSTRACT

A device comprising invertor circuit group including two or more invertor circuits formed by neuron MOS transistors; means for applying a first signal voltage common to the two or more invertors of the invertor circuit group to a first input gate of the invertor circuit; means for applying a given second signal to one or more second input gates other than the first input gate of the invertor circuits; a delay circuit for transmitting the variation of the output voltage of at least one of the invertor circuits of the invertor circuit group with a time delay generated by used of the variation with time of the signal voltage of either or both of the first and second signal voltages; a transistor whose ON and OFF is controlled by the signal transmitted from the delay circuit; storage circuits taking in signals by the ON and OFF of the transistor; and means for executing a given logical operation with respect to the output voltage signals generated by the invertor circuit group. The device has a function of storing the result of the logical operation in the storage circuit.

9 Claims, 10 Drawing Sheets

DATA SORTING CIRCUIT

TECHNICAL FIELD

The present invention relates to a semiconductor device, and has as an object thereof to provide a high performance semiconductor integrated circuit which is capable of ordering a plurality of inputted data by numerical size, that is to say, is capable of conducting high speed sorting, using hardware.

BACKGROUND ART

In the fields of information processing and automatic control, the comparison and discrimination by size of data expressed as numerical values plays an extremely important role.

For example, this includes determining the larger of two numbers, selecting a number of values in order of size from among a plurality of inputted data, and the rearrangement of a plurality of data in order of numerical size, that is to say, sorting, and the like.

Such operations can normally be conducted using a calculator; however, because a large number of operations are required, time is required, and it is extremely difficult to employ real-time control. In particular, in the case of use in the control of robots or the like, because it is necessary to attach the calculator to the robot and conduct calculations, realization by means of small LSI chips is required.

When attempts are made to employ microprocessors and to conduct these operations by means of the programming thereof, enormous amounts of time are required, and application is essentially impossible. Research and development has thus been conducted in order to produce circuits which conduct direct sorting by means of hardware; however, in order to realize such circuits, a large number of elements are necessary, and since operations are conducted through circuits having a number of stages, LSI which is small in scale and capable of high speed operation has not been realized.

The present invention has as an object thereof to provide a semiconductor device which is capable of conducting operations making a size comparison of a plurality of data at high speed, and ordering these data according to size, using simple circuitry.

DISCLOSURE OF THE INVENTION

The present invention is a semiconductor device constructed using one or more neuron MOS transistors having a semiconducting region of one conductivity type on a substrate, having source and drain regions of an opposite conductivity type provided within this region, having a floating gate electrode in a potentially floating state which is provided via an insulating film on the region isolating said source and drain regions, and having a plurality of input gate electrodes capacitively coupled with the floating gate electrode via an insulating film, characterized in being provided with: an inverter circuit group including two or more inverter circuits formed by neuron MOS transistors; a means for applying a first signal voltage common to the two or more inverters of the inverter circuit group to a first input gate of the inverter circuits; a means for applying a given second signal voltage to one or more second input gates other than the first input gate of the inverter circuits; a delay circuit for transmitting the variation of the output voltage of at least one of the inverter circuits of the inverter circuit group with a time delay generated using the variation with time of the signal voltage of either or both of the first and second signal voltages; a transistor whose ON and OFF is controlled by the signal transmitted from the delay circuit; storage circuits taking in signals in accordance with the ON and OFF of the transistor; a means for executing a given logical operation with respect to the output voltage signals generated by the inverter circuit group; and a function of storing the result of the logical operation in the storage circuits.

BRIEF DESCRIPTION OF THE DIAGRAMS

(Description of the References)
101, 121 floating gates,
102, 122 P-channel neuron MOS transistors,
103, 123 N-channel neuron MOS transistors,
104, 124, 151 input gates,
105, 106, 107, 108, 109, 125, 126, 127, 128, 129 inverter circuits.

BEST MODE FOR CARRYING OUT THE INVENTION

Hereinbelow, the present invention will be explained in detail using embodiments; however, it is of course the case that the present invention is not limited to the embodiments described.

(Embodiment 1)

A first embodiment of the present invention will be explained using the circuit shown in FIG. 1.

In the figure, references 103 and 123 indicate N-channel neuron MOS transistors, while references 102 and 122 indicate P-channel neuron MOS transistors. Neuron MOS transistors are transistors which operate in a manner similar to that of the neurons comprising the nerve cells making up the brain; they are a completely new concept in MOS-type transistors which were invented in order to realize neuron computers. (Inventors: Tadashi Shibata, Tadahiro Ohmi, Japanese Patent Application, Provisional Publication, No. Hei 3-6679). Hereinbelow, these transistors will be referred to as "νMOS".

These νMOS are transistors possessing extremely powerful functions; it is an important characteristic of the present invention that such νMOS are employed as basic elements. The structure and function of these νMOS will be explained using the separately attached FIG. 4.

The drains of an N-channel νMOS (abbreviated to "N-νMOS") and a P-channel νMOS (abbreviated to "P-νMOS") are connected to one another, and these thus form an inverter circuit having a CMOS structure employing neuron MOS. This is termed a "complementary νMOS inverter", or is abbreviated to "C-νMOS inverter". References 101 and 121 indicate floating gates and are common to νMOS 102 and 103, and 122 and 123, respectively. References 104, 124, and 151 indicate input gates, respectively, and references $C_1$ and $C_2$ indicate capacitive coupling coefficients between floating gate 101 and input gates 151 and 104, respectively; they also indicate the capacitive coupling coefficients between floating gate 121 and input gates 151 and 124.

References 105, 106, 107, 108, 109, 125, 126, 127, 128, and 129 indicate common inverter circuits; references 112, 113, 132, and 133 indicate NMOS transistors, and function as switches.

In this circuit, inverters 106 and 126, in addition to the standard function of inverting the input signal and outputting, also conduct signal transmission delay in which the time from the entry of the input signal to the exit of the inverted output signal is sufficiently delayed.

Three signal voltages $V_R$, $V_{INA}$, and $V_{INB}$, are inputted into this circuit; $V_R$ is a sweep voltage which varies over time from 0V to $V_{DD}$, and is an input voltage which is common to the input gates 151 of the two C-νMOS inverters 116 and 136. References $V_{INA}$ and $V_{INB}$ are freely selected signal voltages which are inputted into the circuit. Reference 161 indicates a circuit which obtains the exclusive OR of the output $V_{A2}$ of inverter 105 and the output $V_{B2}$ of inverter 125. That is to say, the circuit outputs a value of "0" when the values of $V_{A2}$ and $V_{B2}$ are in agreement, and a value of "1" when these values are not in agreement.

By means of sweeping sweep voltage $V_R$ within a range of 0V to $V_{DD}$, the results of a size comparison between $V_{INA}$ and $V_{INB}$ are outputted to output $V_{AOUT}$ of inverter 109 and output $V_{BOUT}$ of 129. For example, if $V_{INA}$ is larger than $V_{INB}$, then when $V_R$ is swept from 0V to $V_{DD}$, the value of $V_{AOUT}$ is fixed at $V_{DD}$, that is to say, at "1", while the value of $V_{BOUT}$ is fixed at 0V, that is to say, "0".

Figure 4:
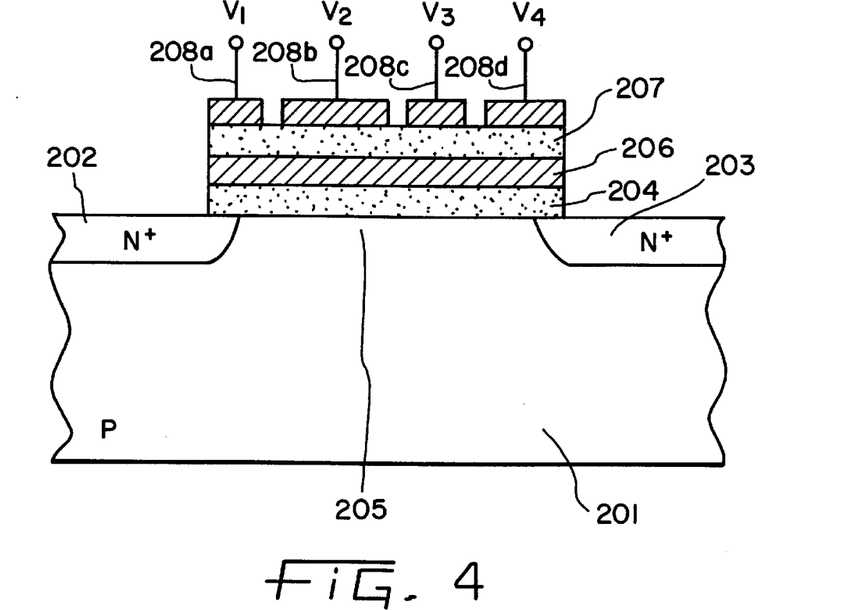
FIG. 4 is an example of the cross sectional structure of a four-input N-channel νMOS transistor (N-νMOS).
Figure 5:
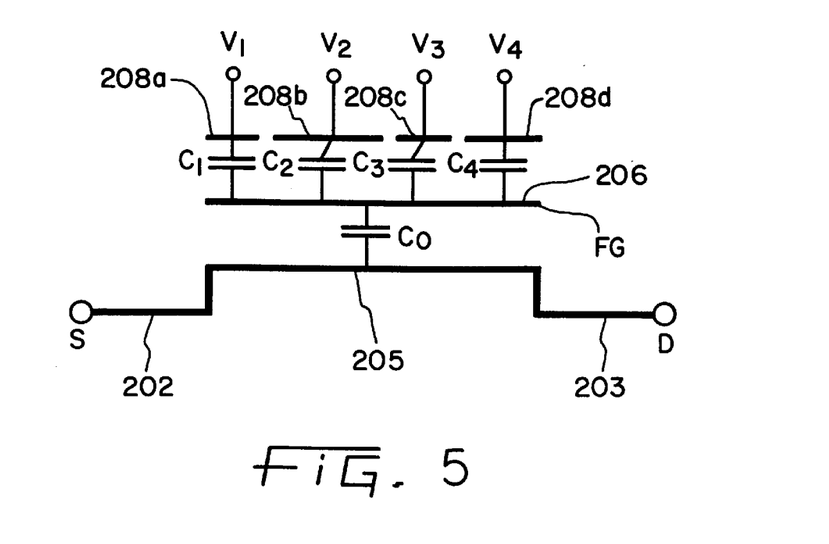
FIG. 5 is a simplified version of FIG. 4.

In order to explain the operation of the circuit of FIG. 1, the structure and the operational principle of the νMOS will first be explained. FIG. 4 shows an example of the cross sectional structure of a four-input N-channel νMOS transistor (N-νMOS); reference 201 indicates, for example, a P-type silicon substrate, references 202 and 203 indicate a source and drain formed from N$^+$ diffusion layers, reference 204 indicates a gate insulating film (for example, a $SiO_2$ film) provided on a channel region 205 between the source and the drain, reference 206 indicates a floating gate electrode which is electrically insulated and in a potentially floating state, reference 207 indicates an insulating film comprising, for example, $SiO_2$ or the like, and references 208a, 208b, 208c, and 208d indicate electrodes which are input gates. FIG. 5 shows a further simplification of this structure for the purpose of an analysis of the operation of the νMOS. If the capacitive coupling coefficients between each input gate electrode and the floating gate are represented, for example, as in the figure, by $C_1$, $C_2$, $C_3$, and $C_4$ and the capacitive coupling coefficient between the floating gate and the silicon substrate is represented by $C_0$, then the potential $\Phi_F$ of the floating gate is given by the following formula.

$$\Phi_F = (1/C_{TOT})(C_1V_1 + C_2V_2 + C_3V_3 + C_4V_4)$$

Here, $C_{TOT} = C_0 + C_1 + C_2 + C_3 + C_4$
References $V_1$, $V_2$, $V_3$, and $V_4$ indicate the voltages applied to, respectively, input gates 208a, 208b, 208c, and 208d; the potential of the silicon substrate is 0V, that is to say, it is grounded.

Now, the potential of source 202 is set to 0V. That is to say, the potentials of all electrodes are set to values measured using a source standard. When this is done, the νMOS shown in FIG. 4 is identical to a common N-channel MOS transistor if the floating gate 206 is viewed as a common gate electrode; if the gate potential $\Phi_F$ becomes larger than the threshold value ($V_{TH}^*$), then an electron channel (N-channel) is formed in the region 205 between source 202 and drain 203, and the source and drain are electrically connected. That is to say, the νMOS is conductive (ON) when the following conditions are met:

$$(1/C_{TOT})(C_1V_1 + C_2V_2 + C_3V_3 + C_4V_4) > V_{TH}^*$$

The above explanation centered on a N-channel νMOS transistor; however, devices also exist in which the source 202, drain 203, and substrate 201 in FIG. 4 are all of the opposite conductivity type. That is to say, in such a νMOS, the substrate is of the N-type, and the source and drain are formed from P$^+$ diffusion layers, and this is termed a P-channel MOS transistor (P-νMOS).

Next, the operation of the C-νMOS inverters 116 and 136 shown in FIG. 1 will be explained.

If the potential of floating gate 101 is represented by $\Phi_{FA}$ and the potential of 121 is represented by $\Phi_{FB}$, then the following results:

$$\Phi_{FA} = \frac{C_1V_R + C_2V_{INA}}{C_{TOT}} \quad (1)$$

$$\Phi_{FB} = \frac{C_1V_R + C_2V_{INB}}{C_{TOT}} \quad (2)$$

and when $\Phi_{FA}$ and $\Phi_{FB}$ are larger than the inversion voltage $V_{TH}^*$ of the inverter as seen from the floating gate (for the purposes of simplicity, the threshold voltage is assumed to be equal in inverters 116 and 136), that is to say, when the following conditions are met:

$$\Phi_{FA} = \frac{C_1V_R + C_2V_{INA}}{C_{TOT}} > V_{TH}^* \quad (3)$$

$$\Phi_{FB} = \frac{C_1V_R + C_2V_{INB}}{C_{TOT}} > V_{TH}^* \quad (4)$$

inverters 116 and 136 enter an ON state, and the output thereof is inverted. Here, in order to simplify the explanation, it is assumed that the condition $C_0 \ll C_1 + C_2$ is met, and that $C_0$ can be ignored. That is to say, it is assumed that $C_{TOT} = C_1 + C_2$. It is of course the case that the following explanation will be completely identical even if $C_0$ has a value approximately equivalent to $C_1 + C_2$.

Figure 1:
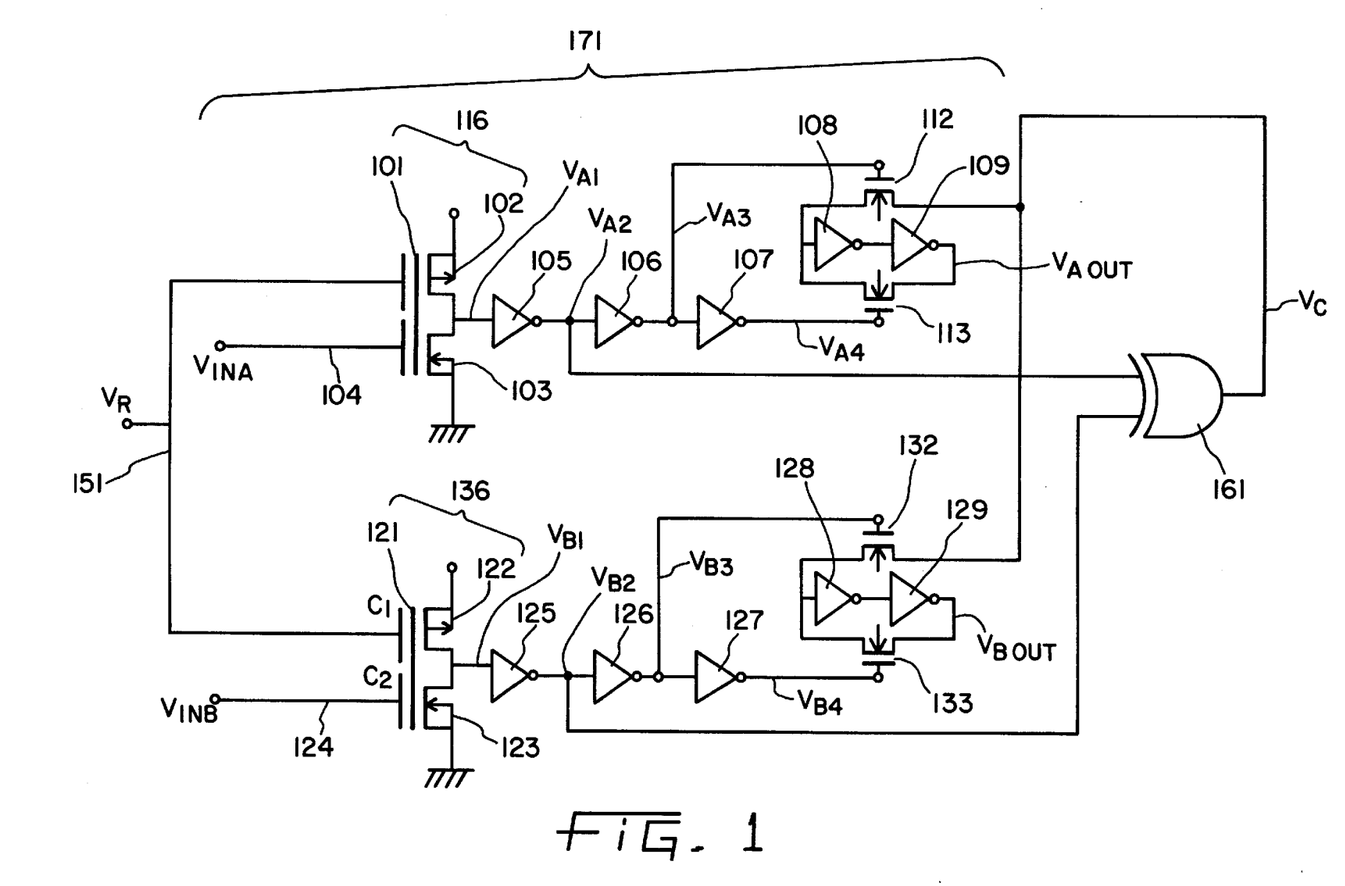
FIG. 1 is a circuit diagram showing a first embodiment.

In the circuitry of FIG. 1, the design is such that, for example, $C_1 = C_2$.

Furthermore, the value of $V_{TH}^*$ is set so as to be $V_{DD}/2$, that is to say, when $V_{DD}$ is 5V, this has a value of 2.5V. It is of course the case that when necessary, these values may be changed to other values.

Under the conditions described above, the conditions under which C-νMOS inverters 116 and 136 enter an ON state are, from formulas (3) and (4):

$$V_R + V_{INA} \geq 5[V] \quad (5)$$

$$V_R + V_{INB} \geq 5[V] \quad (6)$$

Now, it will be assumed that, for example, $V_{INA}$=3V, and $V_{INB}$ =4V, are inputted, and $V_R$ has the value of 0V. Since the conditions of formulas (5) and (6) are not fulfilled, inverters 116 and 136 are OFF, and the output voltages $V_{A1}$ and $V_{B1}$ thereof have a value of 5V.

Accordingly, $V_{A2}$=0V, and $V_{B2}$=0V, and the exclusive OR result thereof, $V_C$, has a value of 0V. Furthermore, conditions are such that $V_{A3}$=5V, $V_{A4}$=0V, $V_{B3}$=5V, and $V_{B4}$=0V, so that NMOS 113 and 133 are all OFF, and NMOS 112 and 132 are ON. Accordingly, a signal $V_C$=0V is inputted into inverters 108 and 128 via NMOS 112 and 132, respectively. $V_C$ is inverted in inverters 108 and 128, respectively, and is then again inverted in inverters 109 and 129, respectively, so that outputs $V_{AOUT}$ and $V_{BOUT}$ contain data equivalent to $V_C$, and have a value of 0V, respectively. That is to say, in this state, $V_{AOUT}$ and $V_{BOUT}$ vary synchronously with $V_C$, and $V_{AOUT}$=$V_C$, and $V_{BOUT}$=$V_C$ is established.

If $V_R$ is assumed to vary with time, then when $V_R \geq 2V$, formula (5) obtains, inverter 116 enters an ON state, and $V_{A1}$ begins to vary from 5V to 0V.

This variation is amplified by inverter 105, and $V_{A2}$ begins to rapidly change from 0V to 5V.

In addition to the standard function of inverting an inputted signal and outputting it, inverters 106 and 126 conduct signal transmission delay, in which the time from the entry of the input signal to the exit of the inverted output signal is sufficiently delayed.

Many methods of realizing this function can be considered. For example, such a function can be realized by reducing the current driving capacity of the inverters by increasing the gate length of inverters 106 and 126, or by reducing the gate width thereof. Furthermore, such a function may be realized by making the capacity connected to the output sides of inverters 106 and 126 (for example, the input gate capacity of inverters 107 and 127) larger than normal. Additionally, such functions can also be realized by increasing the threshold value of the inverters which generate the delay (here, inverters 106 and 126).

In order to transmit the variation in the voltage of $V_{A2}$ to inverter 107 in a slightly delayed manner by means of inverter 106, $V_{A3}$ and $V_{A4}$ maintain the same potential for a brief time even after the νMOS inverter 116 inverts, so that $V_{A3}$=5V and $V_{A4}$=0V, and thus NMOS 112 and 113 are maintained in the same state for a time (NMOS 112 is ON, while 113 is in an OFF state).

The output $V_c$ of 161, which obtains the exclusive OR, is affected by the variation in $V_{A2}$ and immediately changes from 0V to 5V.

At this time, NMOS 112 is still in an ON state, so that the voltage $V_C$ passes through NMOS 112 and is inputted into inverter 108, and as a result, $V_{AOUT}$ also changes from 0V to 5V.

After this, $V_{A3}$ changes from 5V to 0V, and $V_{A4}$ changes from 0V to 5V, and in accordance with this, the 5V output of inverter 109 is automatically subjected to positive feedback to the input of inverter 108 via NMOS 113. This is a so-called "flip-flop circuit", and it is of course the case that this circuit stores $V_{AOUT}$=5V.

In this state, since NMOS 112 is in an OFF state, the data stored in the flip-flop circuit do not thereinafter vary synchronously with $V_C$ even if $V_C$ should change.

On the other hand, νMOS 136 is not inverted, so that NMOS 132 maintains an ON state, while NMOS 133 maintains an OFF state, and in accordance with the change in $V_C$, $V_{BOUT}$ changes from 0V to 5V; however, no positive feedback loop is formed, and the change in $V_C$ is reflected in the change in $V_{BOUT}$.

After this, when $V_R \geq 3V$ is attained, formula (6) obtains, inverter 136 enters an ON state, and $V_{B1}$ begins to vary from 5V to 0V.

This variation is amplified by inverter 125, and $V_{B2}$ rapidly changes from 0V to 5V.

$V_{A2}$ has already attained a value of 5V, so that the output $V_C$ of 161, which obtains the exclusive OR, changes from 5V to 0V in accordance with the change of $V_{B2}$ from 0V to 5V.

At this time, as a result of the transmission delay of the signal at inverter 126, NMOS 132 is still in an ON state, and NMOS 133 is still in an OFF state, so that the voltage $V_C$ passes through NMOS 132 and is continuously inputted into inverter 128, and as a result, $V_{BOUT}$ also changes from 5V to 0V.

After this, $V_{B3}$ changes from 5V to 0V, and $V_{B4}$ changes from 0V to 5V, and in accordance with this, the 5V output of inverter 129 is automatically subjected to positive feedback to the input of inverter 128 via NMOS 133, and $V_{BOUT}$=0V is stored in the flip-flop circuit.

For the purposes of clarity of the above explanation, in the circuit of the first embodiment of the present invention shown in FIG. 1, the ON/OFF state of the gates of NMOS 112, 113, 132, and 133 is inverted in the process of the change in $V_R$ from 0V to 5V, and the value of $V_C$ at these instants is stored in memory.

If $V_{INB}$ is larger than $V_{INA}$, then $V_{AOUT}$=5V and $V_{BOUT}$=0V is stored in the flip-flops, while if $V_{INA}$ is larger than $V_{INB}$, then $V_{AOUT}$=0V, and $V_{BOUT}$=5V is stored in the flip-flops. This memory is maintained while $V_R$ maintains a value of 5V.

By means of this, it is possible to conduct the size discrimination of two voltages by reading out the signals stored in the flip-flops after $V_R$ is swept from 0V to 5V.

The foregoing was one embodiment which conducted a size comparison of two values; however, by using a larger number of νMOS inverters, and furthermore by replacing the circuits which obtain the exclusive OR with circuits comprising full adders, it is possible to construct a sorting circuit which has the function of ordering a plurality of values by size. Such circuits will be explained in the second and following embodiments.

Figure 2:
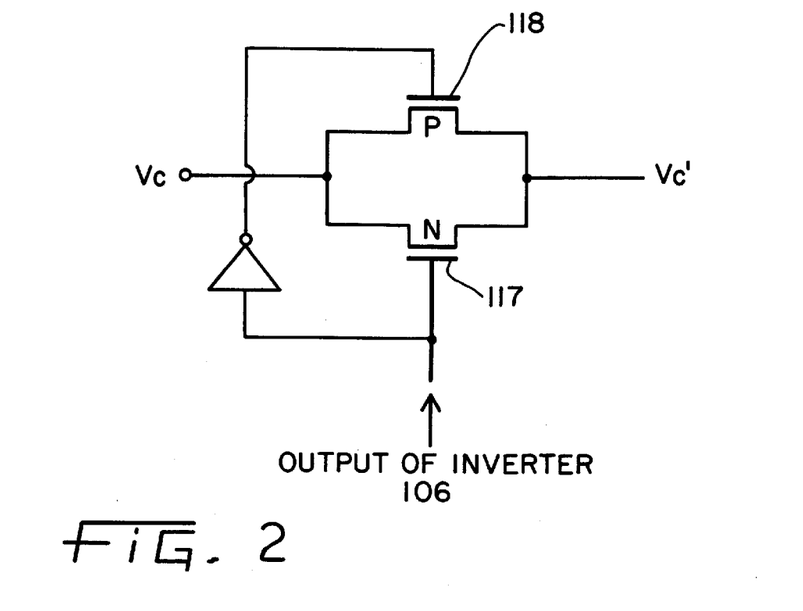
FIG. 2 is a circuit diagram of the νMOS of embodiment 1.

With respect to switches 112, 113, 132, and 133, if CMOS switches such as that depicted in FIG. 2 are employed instead of the NMOS switches, the voltage at both terminals of the switch is equivalent, and more stable circuit operation can be obtained.

With respect to these switch transistors, when NMOS are employed as in FIG. 1, it is acceptable to introduce, for example, a bootstrap circuit method, to set the gate voltages to a sufficiently high level, and to prevent the cut-off of the transistors when the output voltage becomes large. Furthermore, inverters 105 and 125 are not necessarily required. At this time, the circuit which obtains the exclusive OR may be replaced by a circuit which obtains the NOT of the exclusive OR, and $V_{A1}$ and $V_{B1}$ may be inputted into this circuit. Furthermore, the outputs of inverters 106 and 126 may be inputted into the gates of NMOS 113 and 133, respectively, while the outputs of inverters 107 and 127 may be inputted into the gates of NMOS 112 and 132, respectively. Furthermore, resistors may be inserted in place of transistors 112 and 132. In this case, the resistance value thereof should be set so as to be sufficiently larger than the ON resistance of the NMOS or PMOS of inverters 109 and 129, and furthermore, the delay of inverters 106 and 126 should be sufficiently large.

Furthermore, the foregoing explanation referred to only the case in which analog signals were used as the inputs of $V_{INA}$ and $V_{INB}$ in the circuit shown in FIG. 1; however, these may be, for example, digital signals. Hereinbelow, the input method of $V_{INA}$ will be discussed; however, it is of course the case that a completely identical explanation may be made with respect to the input method of $V_{INB}$.

Figure 3:
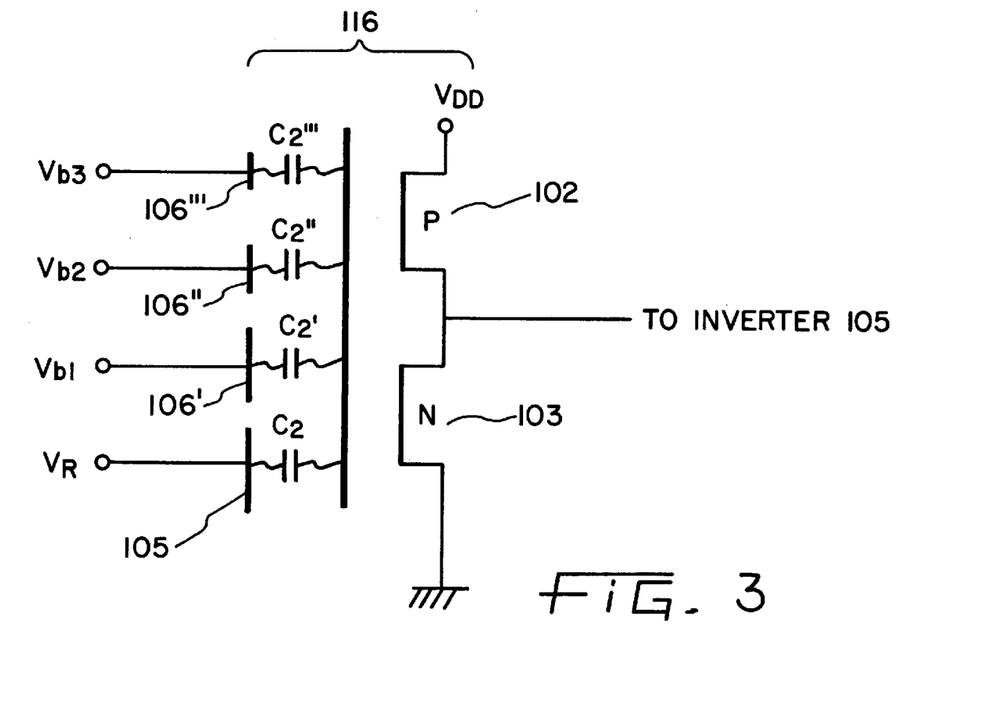
FIG. 3 is a circuit diagram showing a modification of embodiment 1.

FIG. 3 shows an embodiment in which, in place of the analog signal $V_{INA}$, a 3-bit digital signal $V_{B1}$, $V_{B2}$, and $V_{B3}$ ($V_{B3}$ is the least significant bit) is applied; only the C-vMOS inverter 116 portion is depicted. The $C_2$ of FIG. 1 is split into 3 capacitors $C_2'$, $C_2''$, and $C_2'''$, and the respective bit signals are inputted thereinto. At this time, if $C_2':C_2'':C_2'''=4:2:1$, then the following formula, which corresponds to formula (5), obtains:

$$V_R + 1/7\ (4V_{b1} + 2V_{b2} + V_{b3}) \geq 5 \qquad (7)$$

and the D/A converted value of the 3-bit binary signal becomes the input signal.

(Embodiment 2)

Figure 6:
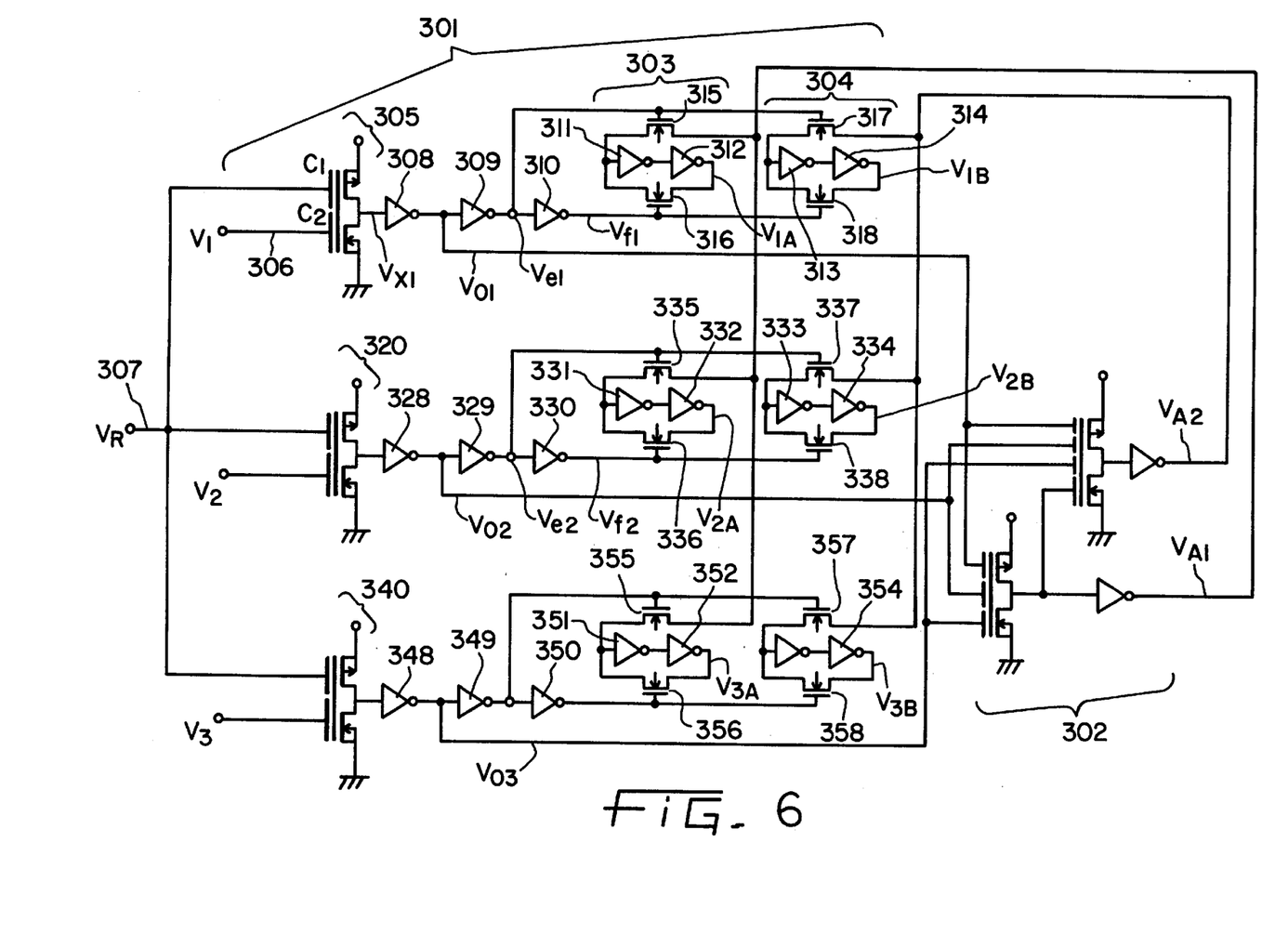
FIG. 6 is a circuit diagram showing embodiment 2.

FIG. 6 is a circuit diagram showing a second embodiment of the present invention; it is a sorting circuit. That is to say, output groups ($V_{1A}$, $V_{1B}$), ($V_{2A}$, $V_{2B}$), and ($V_{3A}$, $V_{3B}$) correspond to the 3 input signals $V_1$, $V_2$, and $V_3$, respectively, and the size order of the 3 inputs is stored in the respective output groups as 2-digit binary signals. This circuit has an extremely important function not only in data searches but in various fields.

The circuit shown in FIG. 6 comprises three blocks in which the circuit block 171 comprising the circuit of FIG. 1 is increased by two pairs of circuits functioning as flip-flops, and an adder 302 which has the function of counting the number of input signals having a value of "1", that is to say, inputs in which the voltage is $V_{DD}$, and converting this to a binary signal.

Since this is a circuit which conducts the sorting of 3 values, 3 circuit blocks 301 are arrayed; however, this may be increased to a freely selected number as necessary. Furthermore, the number of flip-flops 303 and 304 which store the size order belonging to a single circuit block 301 may be increased, where necessary.

In block 301, reference 305 indicates a C-vMOS inverter, and reference 306 indicates an input terminal, into which a signal comprising $V_1$ is inputted.

Reference 307 indicates a control signal input terminal; a signal $V_R$ common to all blocks is inputted thereinto.

Reference 308 indicates an inverter for inverting and amplifying the output voltage of vMOS inverter 305, and references 316 and 318 indicate switching transistors for opening and closing positive feedback loops.

The differences between this circuit and the circuit shown in FIG. 1 are that a 3-input full adder 302 is employed in place of the circuit 161 which obtained the exclusive OR, and that, since the output signal of this full adder comprises 2 bits, flip-flops corresponding to the 2 digits, which store this signal, are provided in each block.

The operation of the present circuit is fundamentally identical to the operation of the circuit of FIG. 1, so that it can be easily understood.

If, as in FIG. 1, in vMOS inverter 305, it is assumed that $C_1=C_2$, and it is further assumed that the inversion voltage as seen from the floating gate is such that $V_{TH}^*=V_{DD}/2=2.5$ [V], and $C_1+C_2=C_{TOT}$, then the conditions under which vMOS inverter 305 inverts are as follows:

$$V_i + V_R \geq 5[V] \qquad (7)$$

The conditions in formula (7) are similar in all blocks, so that the following results:

$$V_i + V_R \geq 5\ [V]\ (i=1, 2, \ldots, n) \qquad (8)$$

Figure 7:
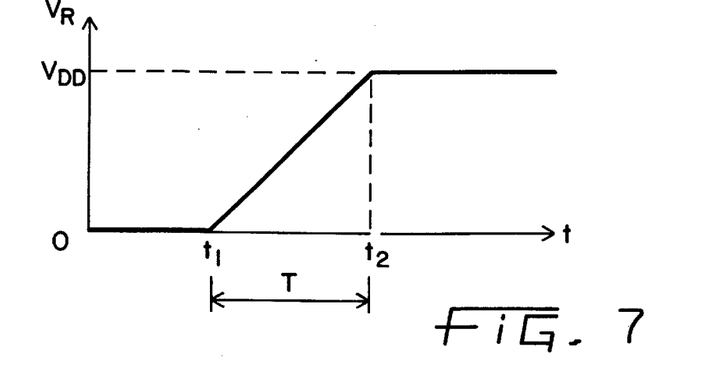
FIG. 7 is a diagram showing the voltage characteristics of $V_R$.

Next, a signal input is employed as $V_R$ which increases, as shown for example in FIG. 7, in a straight line manner from 0V to 5V ($V_{DD}$) with time. $V_R$ is applied commonly to all blocks, so that the conditions of formula (8) are fulfilled first in the block into which the largest value of $V_i$ is inputted. Now, for the purposes of the explanation, it will be assumed that the inputs $V_1$, $V_2$, and $V_3$ decrease in size in that order, so that, for example, $V_1=3.5$ V, $V_2=2.5$ V, and $V_3=1.5$ V. If this is done, when $V_R=1.5$ V, formula (8) obtains in vMOS inverter 305, vMOS inverter 305 inverts, and the output $V_{X1}$ thereof begins to decrease in size from $V_{DD}$ (5V) to 0V. This variation is amplified by inverter 308, and the output $V_{01}$ of inverter 308 changes rapidly from 0V to 5V.

Reference 302 indicates a 3-input full adder, which counts the number of high level inputs (in which the voltage $V_{DD}$ appears) among the three inputs and outputs this as a binary number; when all three inputs have a value of 0V, the outputs $V_{A1}$ and $V_{A2}$ both have a value of 0V, when only one input has a level of $V_{DD}$, then $V_{A1}=0$V, and $V_{A2}=V_{DD}$, when only two inputs have a level of $V_{DD}$, then $V_{A1}=V_{DD}$, and $V_{A2}=0$V, while when all three inputs have a value of $V_{DD}$, then $V_{A1}$ and $V_{A2}$ both have a value of $V_{DD}$.

That is to say, at $V_R=1.5$V, when the output $V_{01}$ of inverter 308 rapidly changes from 0V to 5V, $V_{A2}$ also changes from 0V to 5V.

Inverter 309 is designed so as to generate a sufficient signal transmission delay in the same manner as inverter 106 of FIG. 1; even if the output of inverter 308 changes from 0V to 5V, $V_{e1}$ is maintained at 5V, and $V_{f1}$ is maintained at 0V for a time and a positive feedback loop is not formed, and the outputs of inverters 312 and 314 vary synchronously with $V_{A1}$ and $V_{A2}$, respectively.

After this, $V_{e1}$ varies from 5V to 0V, while $V_{f1}$ varies from 0V to 5V, and in accordance with this, the 0V output of inverter 312, and the 5V output of inverter 314 are automatically subjected to positive feedback to the inputs of inverters 311 and 313 via NMOS 316 and 318, respectively. This is a so-called "flip-flop circuit", and it is of course the case that this circuit stores $V_{1A}=0$V and $V_{1B}=5$V.

In this state, NMOS 315 and 317 are in an OFF state, so that even if $V_{A1}$ and $V_{A2}$ vary thereinafter, the data stored in the flip-flop circuit does not vary synchronously with these values.

On the other hand, vMOS 320 and 340 are not inverted, so that NMOS 336, 338, 356, and 358 are maintained in an OFF state, while 335, 337, 355, and 357 maintain an ON state, and $V_{2A}$ and $V_{3A}$ vary together with the variation of $V_{A1}$, while $V_{2B}$ and $V_{3B}$ vary together with the variation of $V_{A2}$; however, a positive feedback loop is not formed, and the variation of $V_{A1}$ is reflected in the variation of $V_{2A}$ and $V_{3A}$, while the variation of $V_{A2}$ is reflected in the variation of $V_{2B}$ and $V_{3B}$.

Thereinafter, when $V_R$=2.5V, the conditions of formula (8) are fulfilled in vMOS inverter 320, and in the same manner, inverter 328 inverts, and $V_{O2}$ begins to vary from 0V to 5V.

In accordance with this, the output of the full adder is such that $V_{A1}$ changes from 0V to 5V, while $V_{A2}$ changes from 5V to 0V.

Synchronously with this, and in accordance with the principle described above, the outputs of inverters 332, 334, 352, and 354 have not yet formed a positive feedback loop, so that they vary synchronously with $V_{A1}$ and $V_{A2}$, and $V_{2A}$ and $V_{3B}$ both change to 5V, while $V_{2B}$ and $V_{3B}$ both change to 0V.

Thereinafter, $V_{e2}$ changes from 5V to 0V, and $V_{f2}$ changes from 0V to 5V, and positive feedback loops are automatically formed, so that the data $V_{2A}$=5V and $V_{2B}$=0V are stably stored in the flip-flops.

Employing the same arrangement, when $V_R$=3.5V, the data $V_{3A}$=5V and $V_{3B}$=5V are stably stored in the flip-flops.

By means of the above operations, a signal of (0, 1), that is, indicating "1", is stored in the flip-flop of the circuit block into which $V_1$ is inputted, while a signal of (1, 0), that is, indicating "2", is stored in the flip-flop of the circuit block into which $V_2$ is inputted, and a signal of (1, 1), that is to say, indicating a value of "3", is stored in the circuit block into which $V_3$ is inputted.

In this manner, simply by sweeping $V_R$ from 0V to 5V, the order in terms of size of the input voltages $V_1$, $V_2$, and $V_3$ is stored in the flip-flops, and it is thus an extremely simple matter to perform sorting.

Conventionally, in order to realize this type of a sorting function, a computer was commonly employed. That is to say, after converting each input signal from analog to digital, sorting was conducted by conducting a comparison of each data. A number of comparison operations $N^2$ was generally necessary in order to conduct the sorting of a number of data N, and as the number of data increased, an extremely large amount of calculation operations were required, and an enormous amount of time was necessary. Accordingly, high speed processing was not possible using a microcomputer or the like, and the realization of real-time processing for the control of robots or the like was extremely difficult.

In the present invention employing vMOS, simply by conducting one sweep of the ramp voltage of FIG. 7, the circuit automatically conducts the sorting of the input signals, so that extremely high speed processing is possible. Moreover, as shown in FIG. 6, the circuitry can be realized using an extremely small number of elements so that integration on a small chip is possible. Additionally, it is possible to integrate, in addition to this sorting circuit, memory, microcomputers, or D/A and A/D converters on the same chip, and it is thus possible to incorporate this into a robot or the like and to conduct an extremely high degree of data processing at a high speed, and as a result, this technology will have an immeasurably large impact on automatic control technologies, data processing technologies, and the like. One example of the numerous applications possible is an associative memory chip; this will be discussed hereinbelow under the third embodiment of the present invention.

Figure 8:
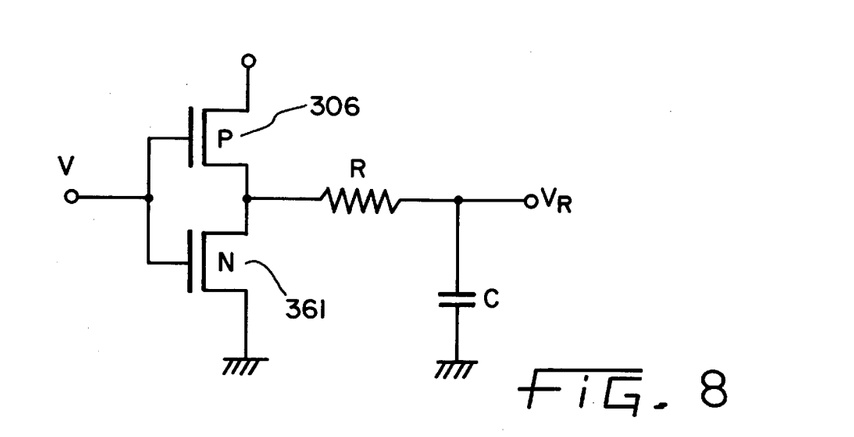
FIG. 8 is a circuit diagram showing a modification of embodiment 2.

In the embodiment described above, a ramp voltage signal which increased in a straight line manner such as that shown in FIG. 7 was employed as $V_R$; however, this is not necessarily so limited, and any signal may be used so long as the voltage value thereof increases with time. If, for example, a circuit such as that shown in FIG. 8 is employed, the $V_R$ output waveform shown in FIG. 9 can be obtained. This is a circuit which charges a capacitor C via a resistor R, and the start-up period thereof is approximately RC.

Figure 9:
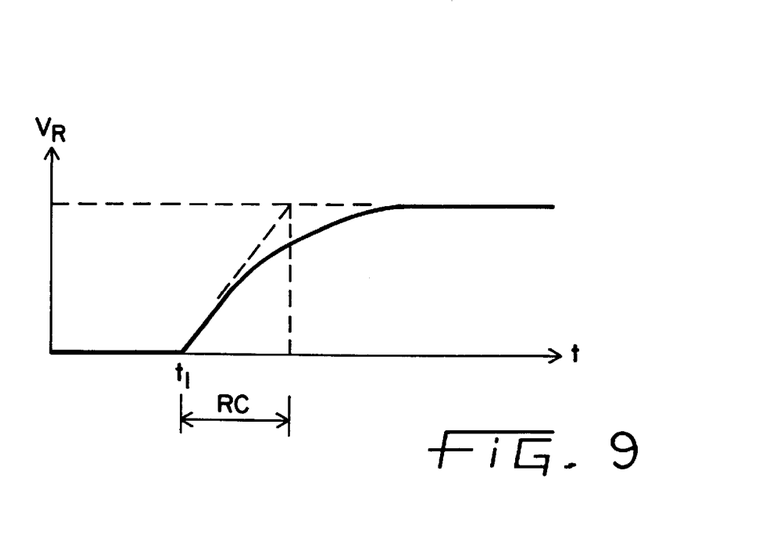
FIG. 9 is a diagram showing the output waveform of $V_R$ of the circuit of FIG. 8.

As is clear from FIG. 9, after a period of time RC has passed, the change in $V_R$ becomes gradual, so that when size comparisons are to be conducted in which any of the input voltages $V_1$, $V_2$, ... $V_n$ is small, or there are only small differences therebetween, the accuracy is improved if this type of $V_R$ is employed.

Figure 10:
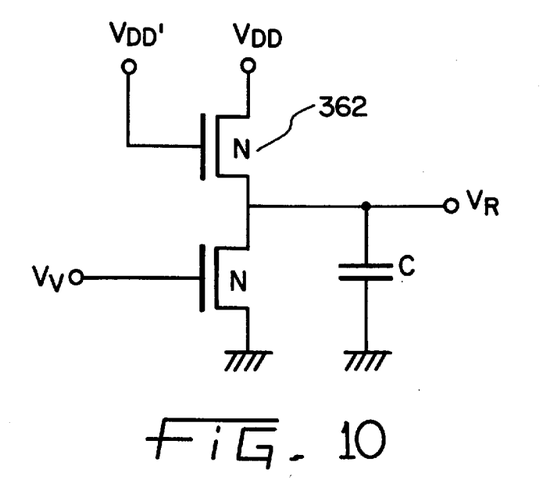
FIG. 10 shows a modification of the embodiment.

In FIG. 8, R and C were employed; however, R may, for example, be omitted, and the ON resistance of PMOS 306 may be made sufficiently larger than the ON resistance of NMOS 361. Furthermore, as shown in FIG. 10, condenser C may be charged via NMOS 362. In this case, as $V_R$ approaches $V_{DD}$, transistor 362 approaches an OFF state, so that the resistance value thereof becomes increasingly large, and the proportion of the increase in $V_R$ becomes extremely gradual, so that more highly accurate comparisons can be conducted. At this time, if $V_{DD}'-V_{TH}>V_{DD}$ is established, then the maximum value of $V_R$ is $V_{DD}$.

Figure 11:
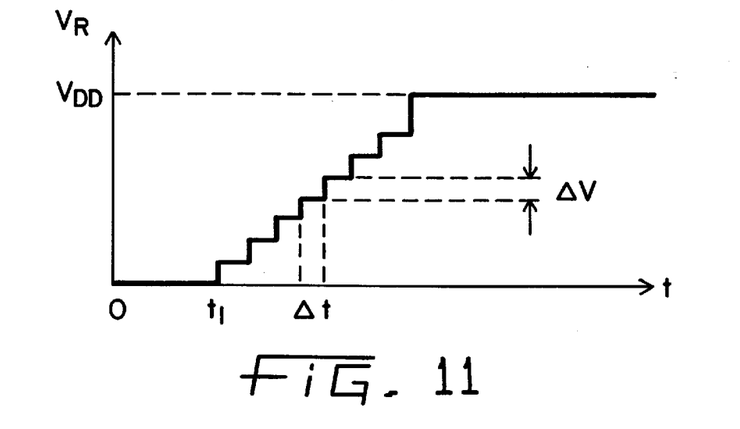
FIG. 11 shows a signal input example of $V_R$.
Figure 12A:
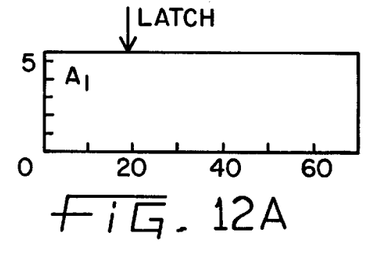
FIG. 12 shows the electrical characteristics of a sorting circuit in accordance with the present invention with respect to a circuit similar to that shown in FIG. 6.
Figure 12B:
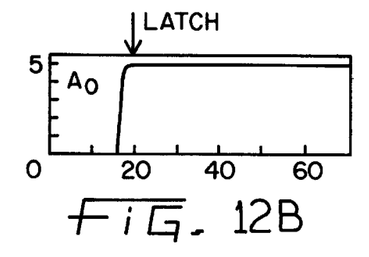
Figure 12C:
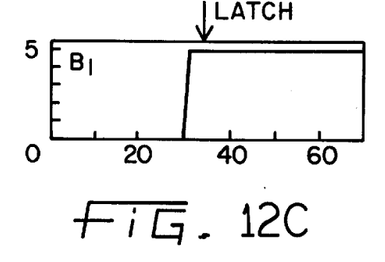
Figure 12D:
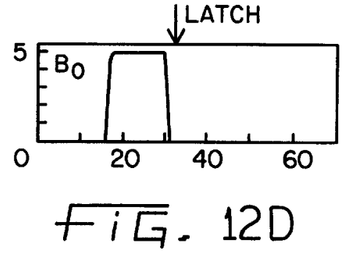
Figure 12E:
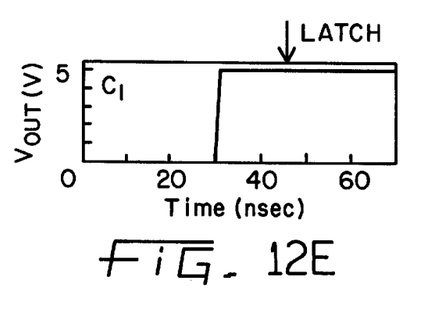
Figure 12F:
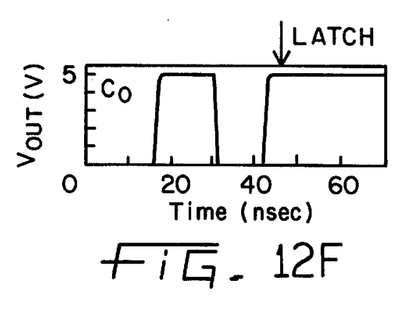

Furthermore, a step-form signal such as that shown in FIG. 11 may be inputted as $V_R$. If this is done, it is possible to simultaneously form a positive feedback loop in all blocks in which the difference from the maximum input is within a range of $\Delta V$. That is to say, when two or more inputs have become extremely close, it is possible to simultaneously identify these inputs as having the same place in the order. This also has the effect of preventing erroneous operation resulting from noise and the like. By means of freely setting the value of $\Delta V$, the data sorting precision may be freely selected.

An identical effect can also be obtained by, in the circuit of FIG. 6, changing the delay period of signal transmission in inverters 309, 329, and 349, which generate the delay. In this case, if the delay period is set so as to be long, the difference $\Delta V$ between input voltages which are recognized as having the same place in the order increases, and if the delay period is shortened, $\Delta V$ can also be reduced.

FIG. 12 shows the electrical characteristics of the sorting circuit of the present invention with respect to a circuit identical to that in FIG. 6.

A ramp voltage such as that in FIG. 7 is applied as $V_R$, and the results are such that $V_1$=3.5V, $V_2$=2.5V, and $V_3$=1.5V.

It can be seen that the results are such that, in the process of sweeping $V_R$ from 0V to 5V, values of $V_{1A}$=0V, $V_{1B}$=5V, and $V_{2A}$=5V, $V_{2B}$=0V, $V_{3A}$=5V, and $V_{3B}$=5V will be successively stored in the flip-flops. That is to say, it can be seen that by means of this, the order by size of the input voltages is $V_1$, $V_2$, and $V_3$, from the largest to the smallest.

In the embodiment described above, $V_R$ was constantly applied to only one gate in each inverter; however, the input gate of 307 may be split into a plurality of input gates, and separate signals may be applied to each.

For example, if the gate of 307 is split into three, $C_1'$, $C_1''$, and $C_1'''$, and the ratio $C_1':C_1'':C_1'''$=4:2:1 is established, then by inputting binary counter signals subjected to 3-bit coding into the respective gates, it is possible to, in effect, apply a step-form signal.

(Embodiment 3)

Figure 13:
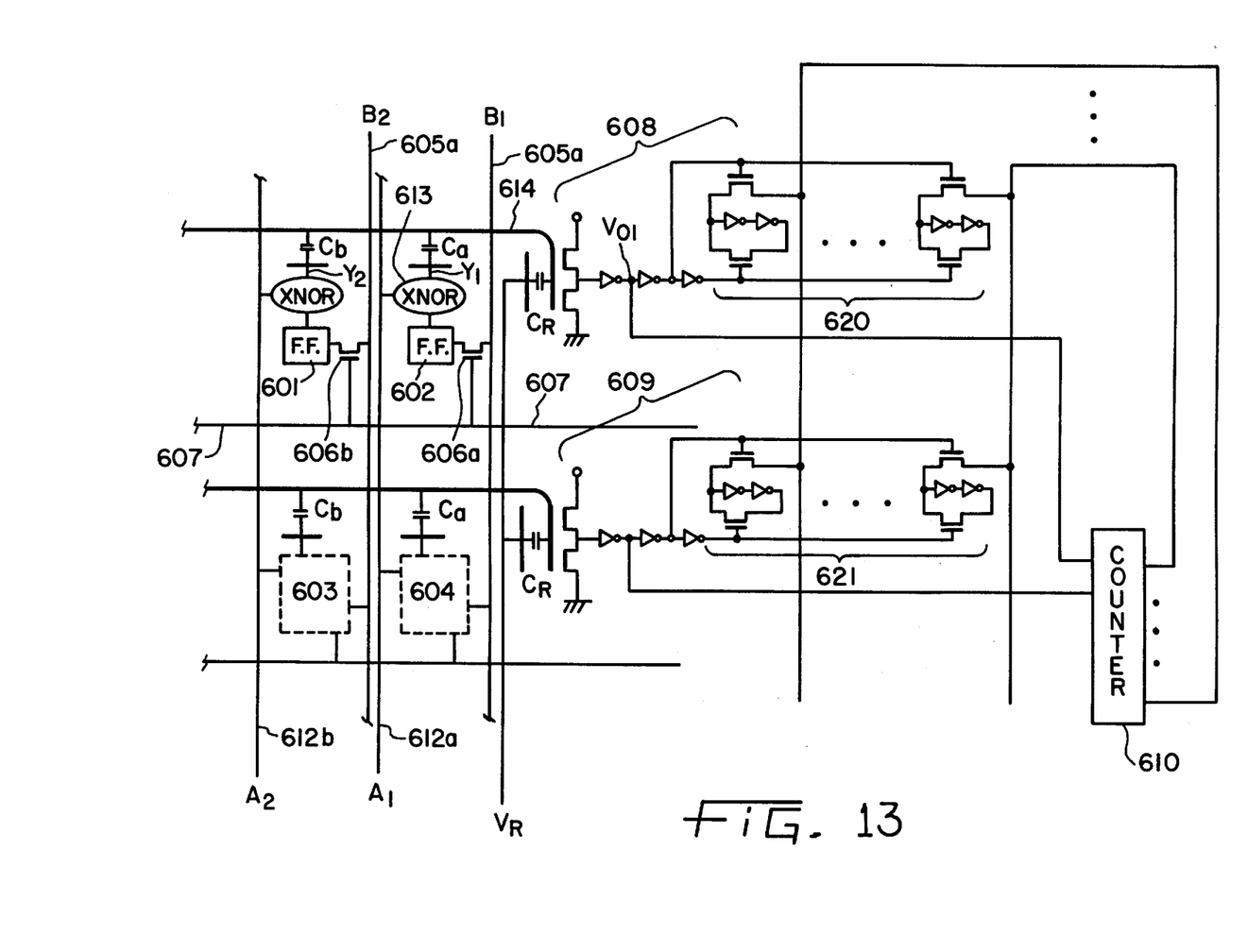
FIG. 13 is a circuit diagram showing embodiment 3.

A third embodiment of the present invention is shown in FIG. 13. This embodiment shows the chief components of an associative memory circuit; using an extremely simple structure, an associative memory chip capable of high speed access can be produced.

Figure 14:
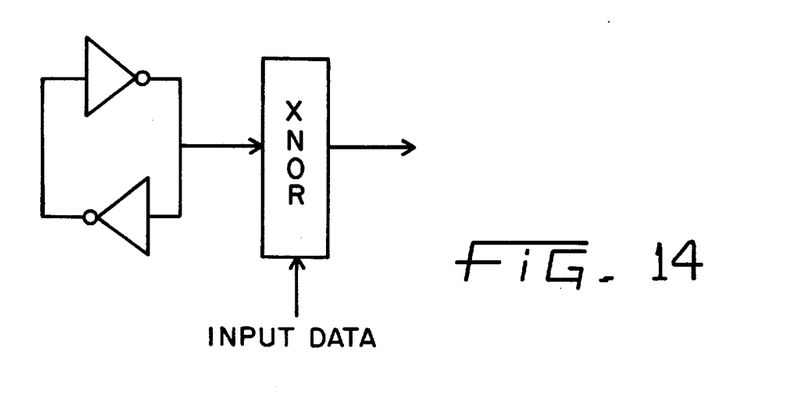
FIG. 14 shows an example of the circuitry of a storage element of embodiment 3.

In the figure, references 601~604 indicate storage elements capable of storing a value of "1" or "0". These may be employed, for example, as flip-flops similar to the static RAM memory cells such as those shown in FIG. 14. Alternatively, dynamic RAM memory cells are acceptable, and non-volatile memory cells such as EPROM, E²PROM, and the like, are also acceptable. Here, for the purposes of explaining the basic principles, only four cells are shown; however, it is of course the case that more may be provided.

For example, cells corresponding to 8 bits may be arrayed horizontally, and the necessary number of data may be arrayed vertically. Furthermore, in order to conduct the data writing in each flip-flop, the data may be set in data lines 605a and 605b, and selector transistors 606a and 606b, and the like, may be placed in an ON state in order to take in the data. In order to place the selector transistor in an ON state, word line 607 may be set to HIGH; however, in the present figure, the circuitry for this purpose is not depicted. Such data selection and writing is commonly-known technology, and as this technology has no direct relationship with the gist of the present invention, an explanation thereof will be omitted.

References 608 and 609 indicate circuits which are identical to the circuit block 301 of FIG. 6, and together with circuits such as 610 and the like, they form a sorting circuit similar to that of FIG. 6.

In 608 and 609, the number of memories formed by flip-flops may be appropriately determined; for example, only a number of bits capable of expressing the vertical number of data in binary form need be provided. For example, if the number of vertical data is 256, memory corresponding to 8 bits is sufficient. Furthermore, it is not necessarily the case that only the number of bits capable of expressing the binary number is necessary; more or less than this may be provided.

Next, the circuit operation will be explained. First, reference data $A_2$ and $A_1$ are inputted from lines 612b and 612a, and a comparison with the data in all memory cells is conducted. The comparison of $A_1$ and the data $X_1$ of memory cell 602 is conducted by means of obtaining the exclusive OR thereof in XNOR circuit 613. The result $Y_1$ of this operation is transmitted to floating gate 614 via capacitor $C_a$.

That is to say, the floating gate potential $\Phi_F$ of the νMOS inverter of 608 is given by:

$$\Phi_F = (C_a Y_1 + C_b Y_2 + C_R V_R)/C_{TOT} \quad (9)$$

This is identical with respect to the νMOS inverter of 609. Accordingly, when a signal such as that shown in FIG. 7 is applied to $V_R$, the inverter having a maximum value of $C_a Y_1 + C_b Y_2$ is the first to invert.

For example, if 608 is assumed to have the maximum value, then $V_{O1}$ first attains a value of "1". The output of the counter 610 which receives this changes, and this voltage is transmitted to the storage circuit portions 620 and 621, in which a positive feedback loop is in operation in each block. After this, a positive feedback loop is automatically formed in the circuitry of 620, and a ranking is stored in the storage circuit. When $V_R$ is further swept, rankings are stored in the storage circuit portions of the blocks by order of size of $C_a Y_1 + C_b Y_2$.

The lesser the ranking stored in the flip-flop of a block, the closer the data in those memory cells (for example, 601, and 602) to the reference data inputs $A_1$ and $A_2$. The reason for this is that the XNOR circuit 613 outputs a value of "1" only when $A_1$ and $X_1$, that is to say, the reference signal and the contents of memory, are in agreement, so that the greater the agreement with the reference signal, the larger the value of formula (9), and the quicker the corresponding inverter will invert.

Figure 17:
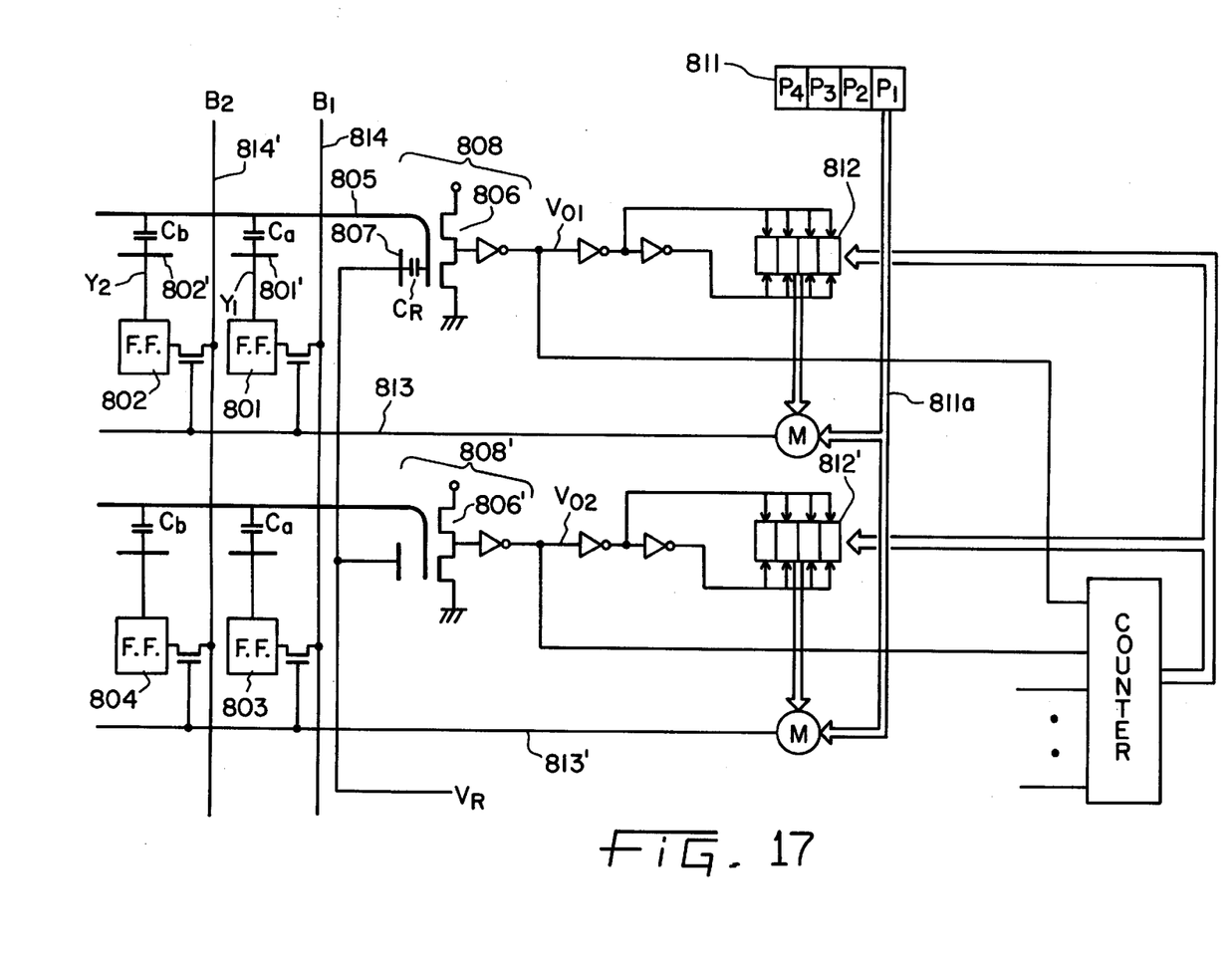
FIG. 17 shows an example of circuitry for reading out the results of the sorting.

FIG. 17 shows an example of circuitry for reading out the results of the sorting.

Reference 811 indicates a terminal for inputting the ranking which is to be read out when reading out data having a desired ranking from among the sorted data to the exterior of the circuit. Reference M indicates a matching circuit; and references 812 and 812' are flip-flops which store the output of the counter and are similar to 620 and 621 in FIG. 13.

After $V_R$ is swept to $V_{DD}$, a bit by bit comparison is made between the signal expressing the ranking stored in the flip-flops and a signal which is inputted from 811, and when all bits are in agreement, this matching circuit outputs a value of 1.

Here, this matching circuit is not depicted in detail; however, as it represents commonly-known technology, it is of course the case that it can be realized.

When the output of this matching circuit reaches a value of "1", for example, when the potential of word lines 813 or 813' increases, the data of each memory is read out to data lines 814 and 814'. That is to say, if the ranking which is to be read out is inputted, it is a simple matter to read out the data having this ranking to a data line.

In the foregoing, for the purposes of simplicity, the case was explained in which the ranking of all blocks after sorting was different; however, equally simple read out is possible even if there are two or more blocks having the same ranking.

In this case, a surplus memory cell may be provided to store the output of the matching circuit, and circuitry may be attached which conducts successive read out only when the signal of this memory cell has a value of "1". Such control is conventional technology, so that it can be conducted in a simple manner.

Here, if a circuit which conducts a size comparison of the binary signal expressing the ranking stored in a flip-flop and the binary signal inputted from 811, taking into consideration the size weighting of the digits, and which outputs a value of "1" only when the flip-flop signal is smaller, is employed instead of the matching circuit, then it is possible to select and successively read out all blocks having a number in the order which is smaller than an inputted number.

If this is applied to data searches and the like in a data bank, it would be possible to, for example, assign ordering numbers to 100 papers based on how close the content thereof was to a certain matter, and it would be possible to select the 10 papers having the closest relationship from among these results.

Furthermore, if two such circuits which conduct size comparison are provided and conduct comparison operations with signals stored in flip-flops with respect to two inputs, and the XOR of the output thereof is used as a read out signal, then it is possible to select only memory data having rankings lying between two inputted rankings, and to successively read out these data.

For example, to use the previous example, it would be possible to assign ordering numbers to 100 papers based on how closely the content thereof resembled certain material, and to select from among the results thereof, for example, from the papers in the vicinity of the thirtieth position to the papers in the vicinity of the twentieth position.

In the above manner, it is possible to construct an associative memory using an extremely simple circuit structure. Moreover, such an associative memory is not merely capable of selecting a data set having data which are closest to a reference signal, but rather makes it possible to order these data with respect to their similarity to their reference signal, and to rapidly ascertain the memory data having a freely selected degree of closeness to the reference signal.

If an attempt is made to construct this type of associative memory using conventional technology, operations are necessary in which each data is compared one by one, the difference between them is calculated, and the size of this difference is arranged from larger to smaller, or from smaller to larger, so that it is not merely the case that extremely complex circuitry is required, but an enormous amount of time is also required for the calculations.

By means of the present invention, it is not merely the case that this type of associative memory can be integrated in a simple manner on an LSI chip, but high speed calculation also becomes possible, and data searches and real-time control of robots and the like can be conducted in an extremely simple manner.

The size of the capacities $C_a$, $C_b$, and the like may all be set to an equal value, so that $C_a = C_b = \ldots$. In this way, the data $X_1, X_2, \ldots$ within the memory cells which has the greatest number of bits in agreement with the reference input data $A_1, A_2, \ldots$ can be read out, and the data having the smallest so-called "Hamming distance" with the data will be obtained.

Alternatively, if the size of $C_a$, $C_b$, and the like is set to a ratio of powers of 2, so that $C_a:C_b:C_c \ldots = 1:2:4: \ldots$, then the circuit will find the number with the smallest difference among the respective numbers which are expressed in binary form. Alternatively, a freely selected size ratio may be established, and weighting may be allocated to the respective bit data in correspondence with the degree of importance thereof.

In FIG. 13, a large number of transistors are normally required in order to construct the XNOR circuit; however, if vMOS are employed, it is possible to realize such a circuit using only four transistors (Japanese Patent Application No. Hei 3-83152). Conventional transistors may be employed; however, by applying vMOS, the overall structure is simplified.

In the circuit of FIG. 13, the values $Y_1$ and $Y_2$ representing the XNOR of the reference data $A_1$ and $A_2$ and the data $X_1$ and $X_2$ stored in memory cells 602 and 601 are inputted into the input gates of vMOS inverter 608 and the like; however, this XNOR circuit 613 may be changed to, for example, an XOR (exclusive OR circuit). At this time, the data set having the least agreement with the reference data will be selected. That is to say, numbering will be conducted in order of the maximum difference from this data.

In the above manner, it is possible to realize various functions in a simple manner.

In the foregoing, the vMOS inverters in all embodiments had a CMOS structure; however, it is of course the case that these may comprise NMOS E/E or E/D inverters.

Furthermore, the explanation centered only on the case in which the floating gates of all the vMOS inverters operated in a constant floating state; however, switching transistors may be connected to the floating gate, and the potential of the floating gate may be fixed at an appropriate given value by means of the ON or OFF state of the transistors.

By means of this, it is possible to change the threshold value of the vMOS inverters, or to refresh the charge implanted in the floating gate during operation.

Here, the memories 601, 602, and the like in FIG. 13 employ storage circuits which stored values of 1 or 0; however, these may be memories which store multi-value levels. If, for example, the portions marked 602 and 613 have a circuit structure such as that shown in FIG. 15, multi-value level matching becomes possible.

Figure 15:
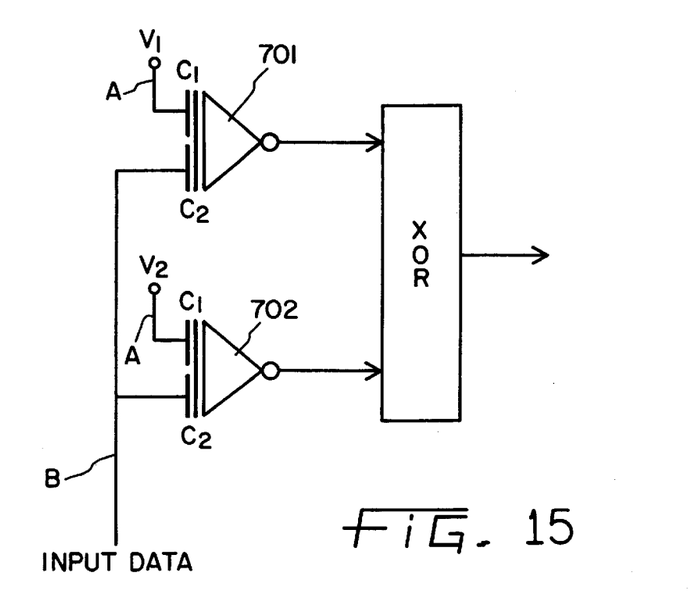
FIG. 15 shows a modified example of embodiment 3.

In FIG. 15, references 701 and 702 indicate C-vMOS inverters; they each have two input gates A and B. A represents input gates which are proper to each inverter, while B indicates an input gate which is common to 701 and 702. Furthermore, the output of 701 and 702 is inputted into an XOR circuit, and when the outputs of 701 and 702 are both "1" or are both "0", the output of the XOR is "0", while when the outputs of 701 and 702 differ, the output of the XOR is "1".

References $V_1$ and $V_2$ are analog inputs which are inputted into the input gates A of the respective C-vMOS inverters; by means of this, it is possible to freely change the apparent threshold value as seen from input gate B. For example, if the capacitive coupling coefficients between input gates A and B and the floating gate are represented by $C_1$ and $C_2$, respectively, then if $C_1:C_2=1:1$, and the threshold value of the C-vMOS inverter as viewed from the floating gate is set to 2.5V, then 701 and 702 invert when the sum of the voltages of nodes A and B reaches 5V. That is to say, if $V_1=2V$ and $V_2=3V$, then when the voltage of the node B of the C-vMOS inverter 701 reaches 3V, and when the node B of 702 reaches a voltage of 2V, respectively, these inverters will invert.

In such a case, if a voltage lying between 2V and 3V, for example, a voltage of 2.5V, is inputted into the node B which is common to 701 and 702, the output signal of 701 will have a value of 1, while the output signal of 702 will have a value of 0, and the XOR output signal will have a value of "1". In actuality, this circuit stores data of a voltage between 2V and 3V, and when a voltage within a range of 2V to 3V is inputted as an input voltage, the stored data and the inputted data are in agreement, and a value of "1" is outputted as the XOR output signal. When a voltage smaller than 2V or larger than 3V is inputted into node B, the output signals of 701 and 702 both have a value of either "1" or "0", and in this case, the XOR output signal has a value of "0". That is to say, this indicates that the stored data and the inputted data are not in agreement.

In this manner, a multi-value level associative memory can be realized simply by replacing the circuitry of 602 and 613 in FIG. 13 with the circuit shown in FIG. 15.

Figure 16:
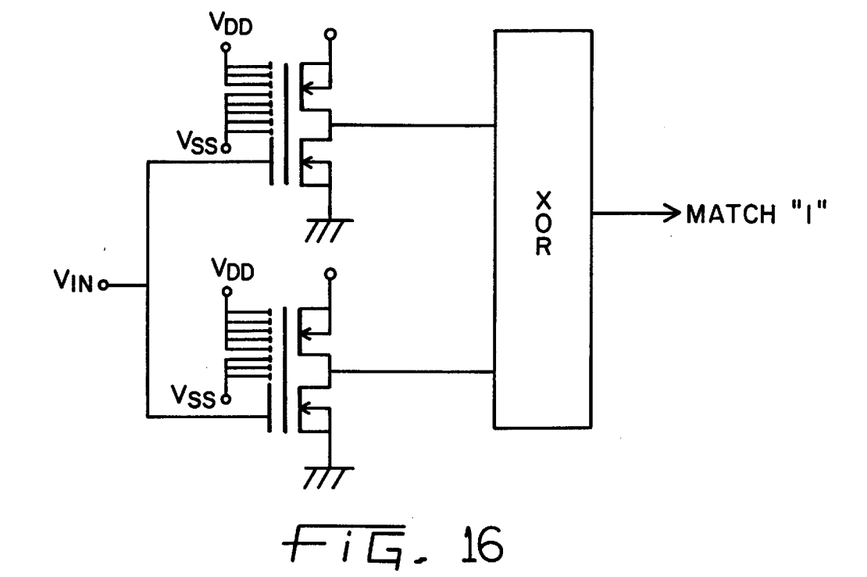
FIG. 16 shows a modified example of embodiment 3.

Furthermore, instead of inputting analog signals $V_1$ and $V_2$ into node A, it is possible to split the input gate of node A as in FIG. 16, and to input binary signals of "1" or "0" thereinto. At this time, the capacity ratios between the respective divided input gates and the floating gate may all be set so as to be equal, or a weighting may be applied, as in 1:2:4: . . ..

Industrial Applicability

By means of the present invention, it has become possible to conduct the size comparison and sorting of a plurality of data at an extremely high speed.

Moreover, because realization is possible with an extremely small number of elements, large scale integration is a simple matter. Accordingly, application to a broad range of fields is possible, beginning with the automatic control required in high speed and real-time processing, and including data searches and the like.

I claim:

1. A data sorting circuit comprising:
   a plurality of circuit groups, each said circuit group comprising a vMOS inverter having first and second input gates, a delay circuit connected to said vMOS inverter for delaying an output signal of said vMOS inverter, and a storage circuit connected to an output of said delay circuit, the operation of said storage circuit controlled by the output signal of said delay circuit;

a logic circuit connected to the output of each said vMOS inverter for executing a logical operation thereon, said logic circuit having an output connected to said storage circuit of each said circuit group;

means for applying a common time-varying signal to said first gate of said vMOS inverter of each said circuit group; and means for inputting data signals to be sorted to respective said second input gates of said vMOS inverters.

2. The data sorting circuit of claim 1, wherein said logic circuit comprises one of an exclusive OR circuit, a fill adder and a counter.

3. The data sorting circuit of claim 1, wherein each said vMOS inverter has two or more said second input gates, and a binary signal is inputted to each said second input gate.

4. The data sorting circuit of claim 1, further comprising a plurality of memory cells for storing an information signal, said memory cells arranged in a matrix wherein a prescribed logical operation is executed on the said information signal stored in a memory cell and the result of said logical operation is inputted to said second input gate.

5. The data sorting circuit of claim 4, wherein said information signal is a binary signal.

6. The data sorting circuit of claim 4, wherein said information signal is a multivalued signal.

7. The data sorting circuit of claim 4, wherein said prescribed logical operation is to execute an exclusive OR of the output of a memory cell and an externally inputted data signal.

8. The data sorting circuit of claim 4, wherein said prescribed logical operation is to execute an exclusive NOR of the output of a memory cell and an externally inputted data signal.

9. The data sorting circuit of claim 4, further comprising switching transistors to read out said information signal stored in said memory cells, wherein the information signal of a memory cell is read out through one of said switching transistors only when said information signal agrees with or has a prescribed relation with an externally inputted signal.

* * * * *